US005878640A

United States Patent [19]

Haar

[11] Patent Number: 5,878,640

[45] **Date of Patent: *Mar. 9, 1999**

[54] PLATE POSITIONING AND FEEDING SYSTEM FOR A PUNCH

[76] Inventor: Thomas Haar, Mittelstieg 15, 25469 Halstenbek, Germany

[ * ] Notice: The term of this patent shall not extend beyond the expiration date of Pat. No. 5,577,427.

[21] Appl. No.: 697,174

[22] Filed: Aug. 20, 1996

Related U.S. Application Data

[63] Continuation of Ser. No. 216,647, Mar. 22, 1994, abandoned.

[30] Foreign Application Priority Data

Mar. 26, 1993 [DE] Germany .......................... 43 09 949.1

[51] Int. Cl.[6] .............................. B65G 25/04; B26F 1/02

[52] U.S. Cl. ................................ 83/206; 83/211; 83/277; 83/280; 83/364; 83/367

[58] Field of Search .............................. 83/206, 209, 211, 83/213, 214, 255, 251, 268, 277, 280, 364, 367

[56] References Cited

U.S. PATENT DOCUMENTS

| | | | |
|---|---|---|---|
| 3,600,997 | 8/1971 | Schmidt | 83/364 |
| 4,297,927 | 11/1981 | Kuroda | 83/36 |
| 4,382,395 | 5/1983 | Haar . | |
| 4,468,992 | 9/1984 | McGeehee | 83/367 X |
| 4,691,817 | 9/1987 | Haar | 198/468.2 |
| 4,778,044 | 10/1988 | Kondo | 83/280 X |
| 4,817,477 | 4/1989 | Emery et al. | 83/364 X |
| 5,016,506 | 5/1991 | Bulso, Jr. et al. | 83/251 X |
| 5,083,487 | 1/1992 | Croteau | 83/364 X |
| 5,400,652 | 3/1995 | Haar | 83/206 |

FOREIGN PATENT DOCUMENTS

| | | |
|---|---|---|
| 539669 | 5/1993 | European Pat. Off. . |
| 3437642 | 4/1986 | Germany . |
| 3841683 | 11/1989 | Germany . |

*Primary Examiner*—M. Rachuba

[57] ABSTRACT

A pair of numerically controlled feed devices are successively operated, with the second feed device taking over from the first feed device when two or more punching steps have been performed. A trailing row of punching tools performs the first punching step with respect to a fresh plate at the same time when a leading row of tools performs the last punching step with respect to the preceding plate. There are provided sensors to determine plate length and/or angularity of the late edges in order to enable a numerical control to compute correction data for correcting the feeding of the plate whereby punching through the trailing and leading edges of the lates is avoided.

9 Claims, 4 Drawing Sheets

PLATE POSITIONING AND FEEDING SYSTEM FOR A PUNCH

This is a continuation of application Ser. No. 08/216,647 filed on Mar. 22, 1994, abandoned.

BACKGROUND OF THE INVENTION

The present invention relates to a plate positioning and feeding system for a punch comprising a positioning station disposed upstream of the punch and including positioning means for positioning a plate with respect to a pair of orthogonal axes, and at least one feed device actuated by drive means controlled by a numerical control. The feed device including gripping means gripping the plate and advancing it to the punch in a cycled manner corresponding to cycling of the punch.

Such systems are used to feed plates, for example of steel or aluminum sheet material, to a punch which punches out a predetermined number of blanks from each plate. By means of the feed, devices each plate is moved step by step through the punch and is subjected to punching steps while it is stationary.

Various feeding systems have become known and are shown for example in U.S. Pat. No. 4 382 395, German Patent 34 37 642, European Patent Specification 92 113 561.2 and German Patent 38 41 683.

The punching of the plates should be performed such that as little material as possible will remain in the punched plates in order to save material. On the other hand it is to be avoided that the punching tools punch through the edges of the plates. Accordingly, it is imperative that the plates be advanced as precisely as possible. The prior art feed systems do not allow for precise positioning and/or require sophisticated and costly control systems for precise positioning of the plates.

It has become known to cut the plates from continuous stock material by means of plate scissors. Such cutting results in variations of the plate length and the angularity of the cut edges of the plates within the manufacturing tolerances.

It is an object of the present invention to provide a plate positioning and feeding system for a punch, which ensures precise feeding and advancing of the plates. A further object of the present invention is to provide a plate positioning and feeding system for a punch, which punches the plates so that residual meshes of minimum material result and punching through the trailing and leading edges of the plates is avoided.

SUMMARY OF THE INVENTION

The plate positioning and feeding system for a punch as defined above includes, according to the present invention, at least two sensors spaced from each other along a transverse axis perpendicular to the feeding direction of the feed devices and arranged to sense leading and trailing edges of a plate so as to provide signals to be used in the numerical control for determining any deviations of the edges of the plate from the transverse axis (angularity) and to correct the feeding of the plate by the drive means of the feed devices.

As mentioned above, the angularity of the leading and trailing edges of a plate is not always correct for punching; The leading and trailing edges do not always extend precisely perpendicularly to the lateral edges of the plate. By means of the two sensors of the present invention any deviations of the leading or trailing edge of the plate from the transverse axis is determined. Such deviation is used to derive a correction factor or value for the numerical control. If the deviation from the transverse axis is an amount so that punching through the leading or trailing edge of the plate cannot be avoided, a stop signal is generated. As an alternative one punching step may be skipped in order to avoid the production of faulty blanks.

When the plate advances from the positioning station to the position for the first punching operation, the leading edge of the plate passes both sensors. The switch-on signals, that is, the occurrences of the signals by the sensors, will be related to the actual positioning of the feed device. This position may be determined by the measuring system of the numerical control at a resolution of 0.01 mm. This allows to correct the further feed of the plate in accordance with the measuring result.

If the switch-on signals of both sensors for one edge of a plate is related to each other, any incorrectness of the angularity of the respective plate edge may be determined.

When the punch includes a pair of rows of tools, only the leading row of tools is used during the first punching step with respect to a certain plate. It must be ensured that the tools do not punch through the leading edge of this plate at this punching step. Furthermore, the plate must not extend into the punching area of the second row of tools at this time. From this follows that any deviation of the angularity must be below a predetermined value in order to avoid edge punching. If this cannot be avoided the operation of the punch is interrupted, or the first critical punching step is skipped.

Additionally, the leading edge of the plate altogether may be related to the length of the path which the plate has to be moved to reach the tool. This allows to correct the first punching position, independently of the actual length of the plate, so that edge punching is avoided. Correction of the first punching position of the plate in accordance with the distance for which the plate is still to be moved and as determined by the sensors allows for maximum increase of the upper limit for deviations of the angularity. It is desired that only few plates exceed the upper limit even with a small remaining web width of, for example, 0.98 mm. This ensures optimum use of the space present between the rows of tools. If the plates are moved into a fixed first punching position which cannot be corrected, it would be necessary to provide a greater value of the remaining web width.

The sensors may be spaced transversely to the feed direction by a predetermined amount and may be arranged to sense the leading and trailing edges of a plate in order to provide corresponding signals. The spacing of the sensors is preferably only slightly less than the width of the plates in order to provide for high measuring accuracy. The numerical control stores a desired value of the length of the plates. The numerical control computes an actual value of the plate length from the two sensor signals. The precise actual length of the plate may be determined by sensing the leading and, respectively, trailing edge of the plate and by use of the values stored in the numerical control. This, however, requires extremely sensitive sensors. This is why the present invention suggests using laser light sensors as the sensors. The actual length of a plate as determined above is compared to the desired value, and the difference between the desired and actual values is used to determine a correction value for correction of the following feeding steps.

The position of the feed device at which the leading edge of the plate is sensed can be related to a fixed predetermined value which is to be expected as the result of the preceding positioning of the plate when the plate is of normal length. Any deviation of this value indicates a deviation of the desired plate length. Within the geometrical possibilities of the tool arrangement the remaining web width of the plate may be used for correcting the total plate length. Determining the plate length in the above described manner requires that the plate in the positioning station has its trailing and lateral edges precisely positioned with respect to reference coordinates.

During the following machining of the plate the same sensors sense the trailing plate edge in the same manner. The evaluation of any deviation of angularity is the same as with the leading edge, however by using switch-off signals. The angularity is monitored, and the actual spacing of the trailing edge of the plate from the tools is sensed and used for correcting the following punching positions and, respectively, feeding steps.

If the plate length is measured before the first punching step, the control of the first feed device must be corrected when a changed plate length has been detected by the sensors and a correction value has been determined. If a second feed device is used which takes over the plate from a first feed device when the plate is already in the punch, the feed length is changed similarly when an actual plate length deviating from a desired value has been detected in order to avoid punchings through the trailing edge of a plate.

Furthermore, a stop signal may be generated also when the comparison of the plate length desired and actual values shows a deviation which would result in faulty blanks.

The system of the present invention may include a pair of feed devices of which the first one feeds a plate from a positioning station wherein the plate has been precisely positioned or aligned with respect to reference coordinates. The second feed device takes over the plate only after the punch has performed already two or more punching strokes. This allows avoidance of idle strokes of the punch. However, this requires that the plates are advanced towards the punch without any gaps therebetween so that the last punching of a plate coincides with the first punching of the next plate.

Where the leading row of tools of a tool arrangement includes one tool less than the second row of tools, the—precisely positioned—plate may be guided during the whole punching operation by prongs or other gripping means on the side of the plate which has not yet been punched.

When both rows include the same number of tools, the last advancing step of the plate must be performed by a suitable feeding means, for example a roller feed. Since this is only the last step, all necessary corrections can be performed before. This allows the last plate position to be defined by mechanical means in the punch instead of for example by an unprecise roller feed.

The prongs or gripping means may be mounted to stiff supports and may be moved by spindles so that high speed cycling is possible. A gripping edge is not required because the feed prongs which hold the plate at the end of the machine operation are disposed laterally of the plates.

Immediately after the change-over the first feed device can be returned to the original position so as to grip a following plate in the positioning station. During the return stroke the gripping means of the first feed device are lowered in order to avoid any interference with the following plates entering the positioning station. The length of the path along which the gripping means of the first feed device have to be moved during the return stroke needs hardly be more than the length of a plate. This may be obtained in a sufficiently short time by means of conventional drive means.

Since the gripping means of the second feed device grip the plate only after the first feed device has advanced the plate already for some punching steps in the punch, the return stroke of the gripping means of the second feed device is relatively short. Also in this case a punching operation without any idle strokes of the punch is possible.

Since the drive means of the first and second feed devices are controlled by a numerical control, the advance movements of the plates are precise both with respect to time and space so that idle strokes of the punch are avoided even under extremely unfavourable conditions.

The gripping means of the second feed device may be moved for a particularly short path when they are arranged to grip the plate in the transfer position at the trailing end of the plate from opposite sides thereof.

Before the gripping means of the first feed device engage a plate, the plate must be positioned precisely with respect to reference coordinates. This is done in the positioning station. Of course, the plate must be moved into the positioning station by suitable conveyor means. To this end, a third feed device is provided, which feeds the plate from a loading station to the positioning station. According to an embodiment of the invention the third feed device includes a pair of parallel conveyor means, for example conveyor bands, which are driven by separate numerically controlled third drive means and which each include a drive member. The drive members are disposed so that one of said drive members is upstream of a plate and the other one is downstream of the plate. The leading drive member which has moved a plate to the positioning station is initially moved into engagement with the leading edge of the following plate, which may require that it is moved back. The leading drive member along with the trailing drive member which engages the trailing edge of the following plate move the plate into the positioning station. Only when this operation has been terminated, the leading drive member returns along with the returning run of the conveyer band, and the leading drive member now becomes the trailing drive member for feeding a further plate towards the positioning station. The separately driven conveyor means allow for rapid and precise feeding of the plate to the positioning station, with the leading drive members acting as abutments during the breaking phase.

BRIEF DESCRIPTION OF PREFERRED EMBODIMENTS OF THE INVENTION

The present invention will now be explained in more detail with reference to the drawings in which.

DETAILED DESCRIPTION OF PREFERRED EMBODIMENTS

Figure 1:
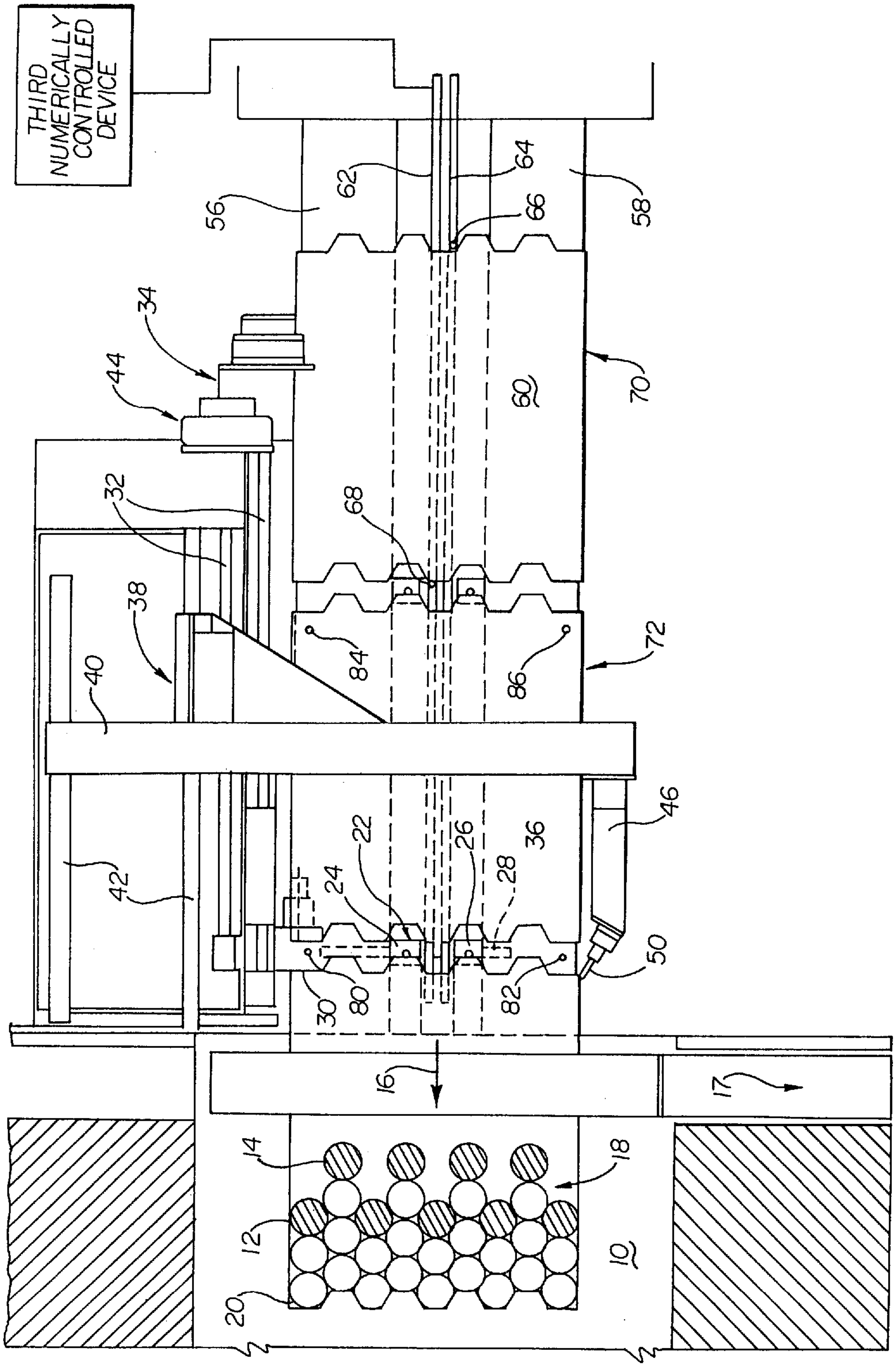
FIG. 1 is a schematic elevation, partially in section, of a plate positioning and feeding system in accordance with the present invention.
Figure 2:
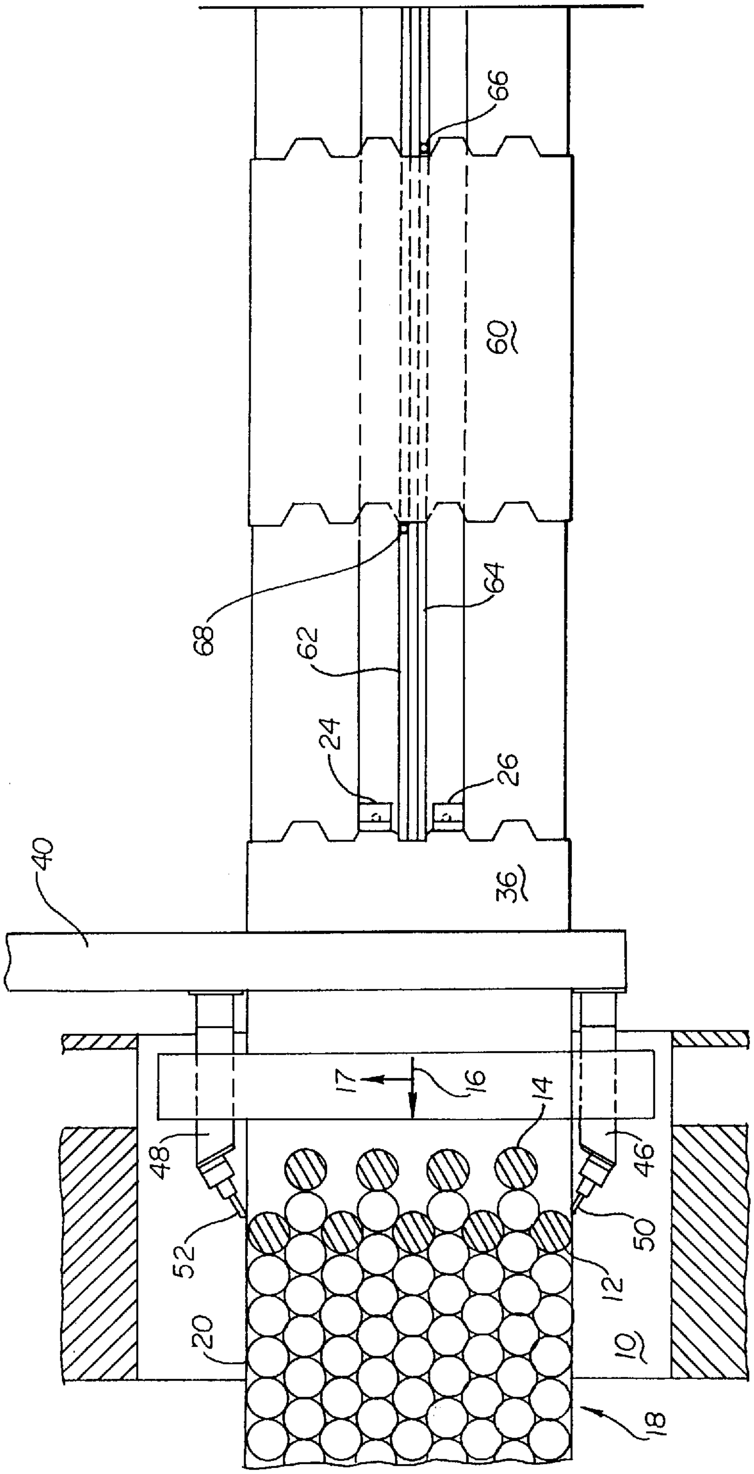
FIG. 2 is an elevation similar to FIG. 1, with the system being in a different operative condition.

Referring to FIGS. 1 and 2, a punch 10 is schematically shown; the punch 10 includes punching tools disposed in a pair of rows 12 and 14. The row 12 which is the leading row with respect to the feed direction 16 includes five tools, while the trailing row 14 includes four tools which are laterally offset with respect to the tools of the leading row 12. As is known in the art the tools are simultaneously actuated by a single punching stroke so as to punch out circular blanks from leading plate 18 of which a so-called mesh 20 will remain.

A first feed device 22 includes a pair of gripping means or prongs 24, 26 arranged to grip the trailing edge of scrolled plate 18. The prongs 24, 26 are mounted to an arm 28 of a carriage 30 which is displaceable in the feed direction 16 along guides 32 by means of a first drive 34. The gripping prongs 24, 26 are adjustable in height in order not to interfere with a following plate such as plate 36 when it returns to its original position.

Figure 3:
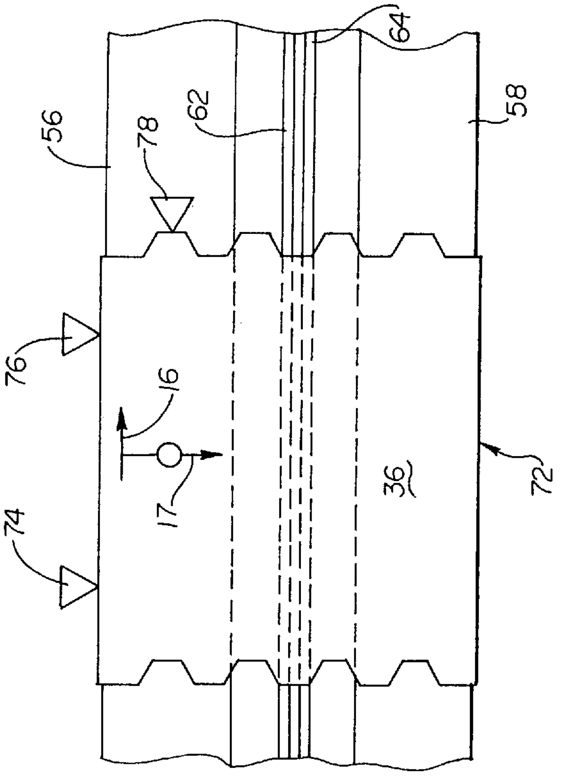
FIG. 3 is an elevation of a detail of the system shown in FIG. 1.

A second feed device 38 includes a carriage 40 which is also displaceable in the feed direction 16 along guides 42. To this end a second drive 44 is provided. The carriage 40 supports a pair of arms 46, 48 of which only arm 46 is shown in FIG. 1 for clarity reasons. FIG. 2 does not show the first feed device except for the gripping means 24, 26. To arms 46, 48 are mounted second gripping means or prongs 50, 52 which grip the plates from lateral sides at their trailing ends. A loading device (not shown) positions the plates upon a pair of parallel slide surfaces 56, 58 which extend to the punch 10. In FIGS. 1 and 2 a plate 60 is shown to be in a loading station 70. Between the slide surfaces 56, 58 extends a pair of parallel narrow conveyor bands 62, 64 which are driven independently of each other by a third numerically drive means (not shown). Each conveyor band 62, 64 includes a drive member or drive dog 66, 68. As shown one drive member 66 engages the trailing edge of a plate 60, while the other drive member 68 is disposed at or ahead of the leading edge of plate 60. By means of the drive members 66, 68 the plate 60 is moved from the loading station 70 to a positioning station 72 which receives the plate 36. The positioning station 72 has been shown in FIG. 3 in more detail in order to indicate that positioning or aligning means (not shown) are provided to position the plate 36 against a pair of lateral abutments 74, 76 and a rear abutment 78. Such positioning or aligning means are well known in the art.

In FIG. 1 laser light sensors 80, 82 are shown to be in the leading area of the positioning station 72, and laser light sensors 84, 86 are shown to be in the trailing area of the positioning station 72. The pairs of light sensors 80, 82 and 84, 86 are spaced from each other for a predetermined amount. The pair of sensors 80, 82 and, respectively, 84, 86 are disposed along a transverse axis extending perpendicularly to the feed direction 16. It is to be understood that only a single pair of light sensors such as 80, 82 is necessary to perform all required functions.

Finally it is to be noted that the first and second drives 34, 44 and the third drive for the conveyor bands 62, 64 are controlled by a numerical control (not shown).

The operation of the system as described is as follows:

The loading device (not shown) positions a plate 60 upon the slide surfaces 56, 58 in the loading station 70, and the drive member 66 of the conveyor band 64 advances the plate 60 to the positioning station 72, possibly along with the feeding of the plate 36 from the positioning station 72 towards the punch 10. In the positioning station 72 the plate 36 is positioned or aligned along a pair of orthogonal axes 16,17 by positioning or aligning means (not shown). The gripping means 24, 26 of the first feed device 22, which are lowered when the carriage 30 returns in order not to interfere with the feeding of a plate to the positioning station, grip the plate 36 at its trailing end as indicated by dash-dotted lines in FIG. 1. At this time the second feed device 38 advances the plate 18 through the punch 10 by means of the gripping means 50, 52. Feeding of plates 36, 18 and operation of feed devices 22 and 38 are coordinated by the numeric control such that the last punching step with respect to plate 18 occurs at the same time as the first punching step with respect to plate 36, as indicated in FIG. 2. The last punching of plate 18 is performed by the tools of row 12, and the first punching of the fresh plate 36 is performed by the tools of row 14. The change-over, accordingly, occurs without any idle stroke of punch 10.

As soon as the last punching of the plate 18 has been performed, the gripping means 50, 52 are released, and the carriage 40 can be returned to its initial position as shown in FIG. 1. The gripping means 24, 26 of the first feed device 22 take over the feeding of plate 36 through punch 10 for a number of punching steps, for example two or more. This is why the gripping means 50, 52 need to be moved for a relatively short back stroke before the change-over, as may be seen from a comparison of FIGS. 1 and 2. The advancing of plate 18 during the first part of the punching steps is performed by the gripping means 24, 26 shown in full lines. When a predetermined number of punching steps has been reached, the change-over from the first feed device 22 to the second feed device 38 is accomplished by opening the gripping means 24, 26 and closing the gripping means 50, 52. This change-over occurs during a punching stroke, i.e. during engagement of the tools with the plate, because the plate is held in a fixed position at this time. Thereafter the second feed device 38 carries out the remaining feeding or advancing steps until the "empty" residual mesh is removed by ejection means (not shown) such as a pair of driven rollers.

When the gripping means 24,26 have been opened, they are lowered below the plane of advancing movements and returned to the initial position (indicated in FIG. 1 by dash-dotted lines) in order to engage a following plate 36 and to advance it to the punch 10.

Figure 4:
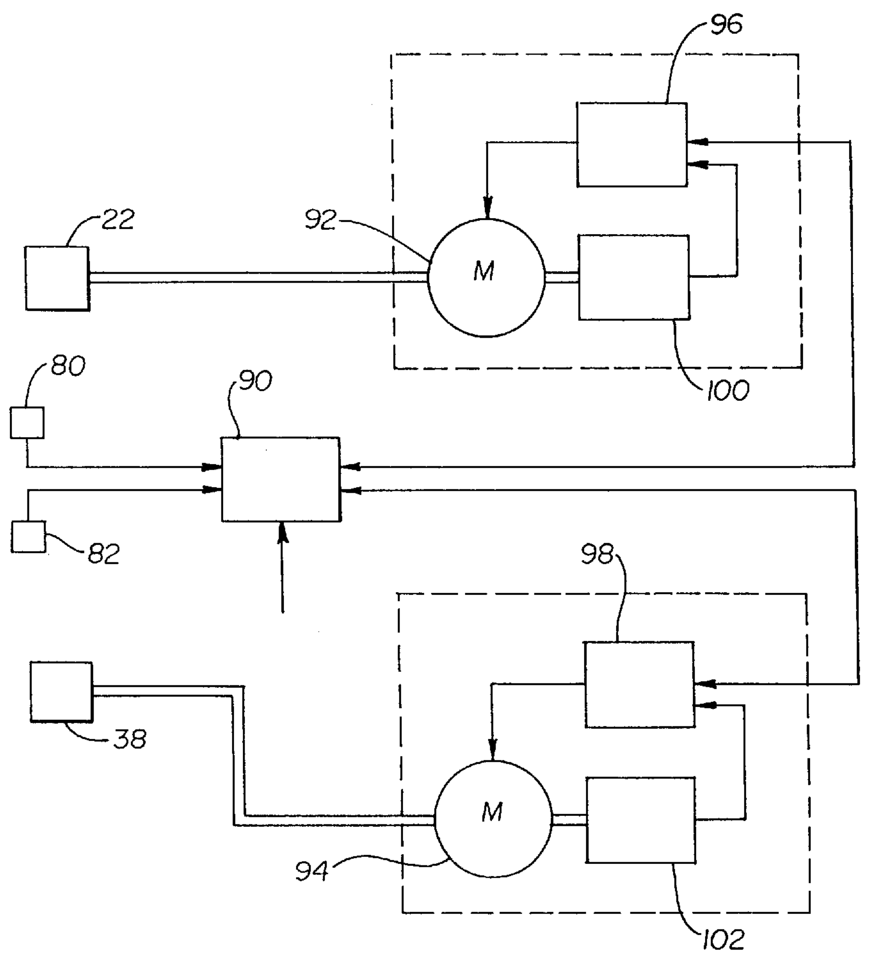
FIG. 4 is a schematic diagram of a circuit for the drive means of the first and second feed devices.

FIG. 4 shows a numerical control 90 for the plate positioning and feeding system of FIGS. 1 and 2. The numerical control 90 cooperates with sensors 80, 82. There are provided motors 92, 94 for operating the first feed device 22 and second feed device 38, respectively, as known in the art. To this end, frequency converters 96 and 98 are connected to resolvers 100 and 102, respectively, which deliver signals representing the frequency of motors 92 and 94, respectively, to frequency converters 96 and 98, respectively. The latter receive furthermore signals provided by the numerical control 90. This occurs in accordance with a program stored in the numerical control 90 and with signals by sensors 80, 82 which will be explained in more detail below.

Feeding of a plate 60 from the loading station to the positioning station which is performed by means of the respective trailing drive member 66 or 68, is accomplished relatively precisely and smoothly in that the respective leading drive member 68 or 66 acts as an abutment or braking means so that transfer of the plate to the positioning station 72 occurs very smoothly.

When a plate 36 is moved by the first feed device 22 from the positioning station 72 towards the punch 10, the leading edge of plate 36 passes both laser light sensors 80 and 82. By means of sensors 80, 82 any deviation of the leading or trailing edge of a plate from a transverse axis may be determined. This is performed in the numerical control 90 which furthermore computes a correction factor. If any such deviation is of a value so that punching through the leading edge of a plate cannot be avoided, it is possible to provide a stop signal in order to avoid the production of faulty blanks.

When for example plate 36 is advanced, its leading edge passes both light sensors 80, 82. The switch-on signals of the sensors 80, 82 will be related to the actual position of the feed device 22. This position can be determined by the measuring system of the numerical control 90 at a minimum resolution of for example 0.01 mm. This allows for the correction of the further feeding of the plate by the motors 92, 94 in accordance with the measuring result.

In the embodiment shown in FIGS. 1 and 2 there are two rows of punching tools, with the first punching of a plate being performed by the punching tools of the first row 14 only. It must be ensured that during such first punching operation a web between the punching holes and the periphery of the plate remains, while the plate does not extend into the work area of the punching tools of the second row. Accordingly, any deviation of the leading edge of the plate from a transverse axis must be below a predetermined fixed value. If this is not the case, the punch is either stopped or the first critical punching operation is skipped.

Additionally, it is possible to relate the leading edge of the plate to the distance for which the plate has still to be advanced to reach the first row 14 of punching tools. So it is possible, irrespective of the absolute plate length, to adapt the first punching position of the plate while it is moved thereto, so that punching through the leading edge is avoided. Correction of the first punching position of the plate in accordance with the distance for which the plate is still to be moved and as determined by the sensors 80, 82 allows for maximal increase of the upper limit for any deviations of the angularity. It is desired that only few plates exceed the upper limit even with small remaining web width. This ensures optimal use of the space present between the rows of tools 12 and 14. If the plates are moved to a fixed first punching position which cannot be corrected, it would be necessary to provide a greater value of the remaining web width.

Sensing the leading and trailing edges of a plate by sensors 80 and 82 and sensors 84, 86, respectively, allows to determine the actual plate length and accordingly any deviation from a desired plate length. The desired plate length for example may be stored in the numerical control 90 which computes a correction value for the feed.

The actual length of the plate 36 as determined by the numerical control is compared to a stored value of the desired length. If for example the plate 36 is shorter than the desired length, the numerical control must ensure that the first feed device 22 advances the plate 36 sufficiently far into the punch 10 so that at the first punching step a web remains at the leading edge of the plate 36 as shown in FIG. 2 since otherwise faulty blanks would be produced. This is why the numerical control uses any deviation between desired and actual plate length to compute a correction value in order to correct the feed path or the length of the feed steps so that no faulty blanks are produced. The same is true for the feeding of the leading plate 18 by the second feed device 38. If the plate is too short, faulty punching at the rear end of the plate 18 could result. Correspondingly correcting the feed of the feed device 38 between the stamping steps ensures that a web remains also at the trailing edge of the plate. This may be achieved for example by making each of the feeding steps performed by the feed device 38 somewhat shorter than originally programmed, with the result that the webs between the punchings also become somewhat narrower. Altogether, however, this allows a "gain" in a certain length which enures that punching through the trailing edge will not occur at the last punching step. If only the leading sensors 80, 82 are used, sensing of the trailing plate edge allows for a determination of the plate length or the residual plate length available for the remaining punching steps in order to be able to provide for a correction of the feed in the above described manner.

As may be appreciated it is possible to use only a pair of sensors which are for example close to the tools. This of course would be simpler than the use of four sensors.

What is claimed is:

1. A plate positioning and feeding system comprising:

a punch into which plates, having leading and trailing edges, may be fed along one feed direction, said punch having two parallel rows of punching tools for cyclically punching blanks out of said plates, said rows of tools extending transverse to said feeding direction;

a positioning station disposed upstream of the punch, said positioning station having a leading position located at the downstream end of the positioning station and a trailing position located at the upstream end of the positioning station;

positioning means for positioning a plate with respect to a pair of orthogonal axes in the positioning station;

a first drive means controlled by a numerical control; and at least one feed device driven by the first drive means, the feed device including gripping means which is constructed and configured to grip the plate in the positioning station and to feed the plate into said punch, whereby said plate is capable of being fed into said punch in a step by step manner in correspondence with said cycling of said punch, the system further comprising:

at least two sensors (80, 82, 84, 86) being spaced apart from each other along a transverse axis perpendicular to the feeding direction (16) of the feed device and arranged in the path of the fed plate to be passed by the leading and trailing edge of the plate during feeding and to sense the leading and trailing edges of the plate (36), the sensors being communicatively connected to the numerical control so as to provide signals to the numerical control, the numerical control being capable of using said signals to determine any deviations of said edges of said plate (36) from said transverse axis (angularity) and, with such determinations, of controlling the first drive means and the feeding device to correct the feeding of the plate by causing the first drive means to vary the length of the feeding steps of the feed device so as to prevent punching of incomplete blanks at the leading and trailing edges of the plates.

2. A system as defined in claim 1, wherein said numerical control has a stored predetermined value and is capable of providing a stop signal to the first drive means when, during feeding of the plate, any any deviation of said plate edges from said transverse axis exceeds the predetermined value.

3. A system as in claim 2, further comprising:

a second numerically controlled drive means, wherein the punch (10) includes a pair of rows of punching tools (12, 14), the rows being spaced along the feed direction (16) of the plates (18, 36, 60), said at least one feed device comprising:

a first feed device (22) having a first gripping means (24, 26), the first feed device being displacable along the feed direction by the first drive means (34)

between said leading and trailing positions, and the first gripping means being constructed to grip a first plate in said positioning station (72) when in its trailing position and to advance the plate towards the punch (10) in the feed direction to a change-over positions, which is located downstream of said positioning station (72) and which corresponds to the positioning of the plates (18, 36) during a punching stroke of the punch (10) when the punch (10) has performed at least one preceding punching stroke on a second plate; and a second feed device (38) having a second gripping means (50, 52), the second feed device being displacable along the feed direction by the second numerically controlled drive means (44) between the leading position and the punches and the second gripping means being constructed to grip the first plate when said first plate driven fully downstream by the first feed device and is in said change-over position, said first and second feed devices being connected in communication with and controlled by their respective numerical controls and capable of driving said first and second feed devices (22, 38) such that said first and second feed devices cooperate so that the punching tools (12) in the leading row perform the last punching stroke with respect to a first plate (18) at the same time when the punching tools in the trailing row (14) perform the first punching stroke with respect to the following plate (36).

4. A system as defined in claim 3, said second feed device comprising a carriage which extends transverse to the feed direction and has a first end and a second end, wherein said second gripping means (50, 52) are connected to both the first and second end and, whereby the gripping means are capable of laterally gripping each plate (18) from opposite sides.

5. A system as defined in claim 3, further comprising a third feed device and a loading station, wherein the loading station (70) is provided upstream of said positioning station (72) and the third feed device is provided to advance the plates (60) into said positioning station (72).

6. A system as defined in claim 5, further comprising a third numerically controlled drive means, wherein said third feed device includes a pair of parallel conveyor means (62, 64) which are driven by the third numerically controlled drive means and each including a drive member (66, 68), the third drive means being connected in communication with and controlled by their respective numerical controls and capable of driving said drivemembers such that said drivemembers cooperate such that when a plate is being loaded and driven into the positioning station one of said drive members is disposed upstream of the plate (60) during the advancement of the plate from the loading station to the positioning station and the remaining drivemember is disposed downstream of said plate (60).

7. A plate positioning and feeding system comprising:

a punch into which plates, having leading and trailing edges, may be fed along one feed direction, said punch having two parallel rows of punching tools for cyclically punching blanks out of said plates, said rows of tools extending transverse to said feeding direction;

a positioning station disposed upstream of the punch;

positioning means for positioning a plate with respect to a pair of orthogonal axes, wherein one of said axes corresponds to the feed direction, a first drive means controlled by a numerical control; and at least one feed device driven by the first drive means, the feed device including gripping means which is constructed and configured to grip the plate in the positioning station and to feed the plate into the punch, whereby said plate can be fed into said punch in a step by step manner in correspondence with the cycling of the punch, the system further comprising:

at least two sensors (80, 82, 84, 86) disposed between said positioning station (72) and the punch (10) and spaced from each other transversely to said feed device, said sensors being capable of and arranged to sense the leading and trailing edges of the plate (36) when the plate is fed toward the punch and of providing corresponding signals to the numerical control, said sensors and numerical control being connected in communication, said numerical control being capable of calculating an actual value of the plate length from said sensor signals, the numerical control and the feed device being connected in communication, and receiving feed data from the feed device and comparing said actual value of the length with a stored desired value for the length in the numerical control and computing a correction value from any difference between said desired and actual values, with said correction value said numerical control being capable of correcting a further feed step of the respective plate by said first drive means (34, 44) by varying the length of the feed steps of the feed device.

8. A system as defined in claim 7, wherein said numerical control has a stored predetermined value and is capable of providing a stop signal to the first drive means when, during feeding of the plate, any difference between said desired and actual values or any deviation of said plate edges from said transverse axis exceeds the respective predetermined value.

9. A system as defined in claim 7, wherein said sensors (80, 82, 84, 86) comprise laser light sensors.

* * * * *